United States Patent [19]

Stulken

[11] 4,448,187
[45] May 15, 1984

[54] DEVICE FOR HEATING ABSORBENT SURFACES WITHIN AN ENCLOSED SPACE WITH SOLAR THERMAL RADIATION

[76] Inventor: Leon Stulken, Rte. 2, Hastings, Nebr. 68901

[21] Appl. No.: 378,692
[22] Filed: May 17, 1982
[51] Int. Cl.³ .............................................. F24J 3/02
[52] U.S. Cl. ................... 126/417; 126/428; 126/439; 350/258; 350/264
[58] Field of Search ............. 126/417, 430, 428, 429, 126/450, 439, 451, 438; 350/258, 264, 263

[56] References Cited

U.S. PATENT DOCUMENTS

| | | |
|---|---|---|
| 626,449 | 6/1899 | White . |
| 1,434,075 | 10/1922 | Van Schooneveld . |
| 1,567,984 | 12/1925 | Reid . |
| 1,822,029 | 9/1931 | Harvey . |
| 1,832,304 | 11/1931 | Hutchinson . |
| 2,494,879 | 1/1950 | Journel ................................... 88/25 |
| 2,515,682 | 7/1950 | Zimmerman ............................ 88/60 |
| 2,524,230 | 10/1950 | Martin ............................ 98/99.7 X |
| 3,012,294 | 12/1961 | Waldor ........................... 126/429 X |
| 3,863,621 | 2/1975 | Schoenfelder .................. 126/429 X |
| 3,990,635 | 11/1976 | Restle et al. .................... 126/429 X |
| 4,309,981 | 1/1982 | Briggs et al. ........................ 126/417 |

Primary Examiner—Larry Jones
Attorney, Agent, or Firm—E. Robert Newman

[57] ABSTRACT

A device for reflecting solar thermal radiation through an easterly-westerly oriented window having a reflecting surface (16) hinged (19a) along the north side of the window in a manner which provides for its upwardly facing tilt as it swings away from the building wall and hinged (21), (21a) along its upper side for use as a solar shade. Sandwiched insulation (41) behind the reflecting surface (16) and a peripheral spacer (42) are also provided for insulating the window opening when the device is pivoted to a closed position against the building wall.

12 Claims, 12 Drawing Figures

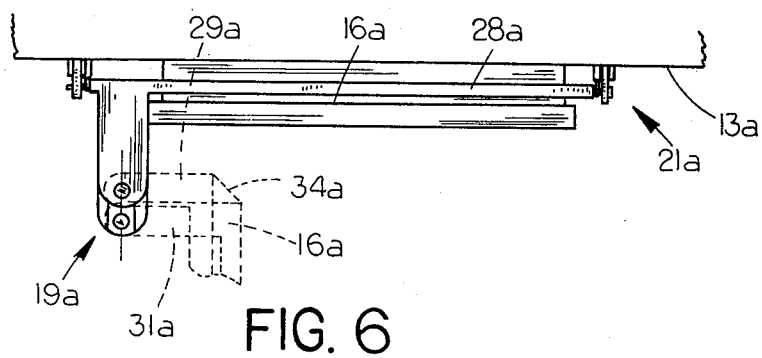
FIG. 6
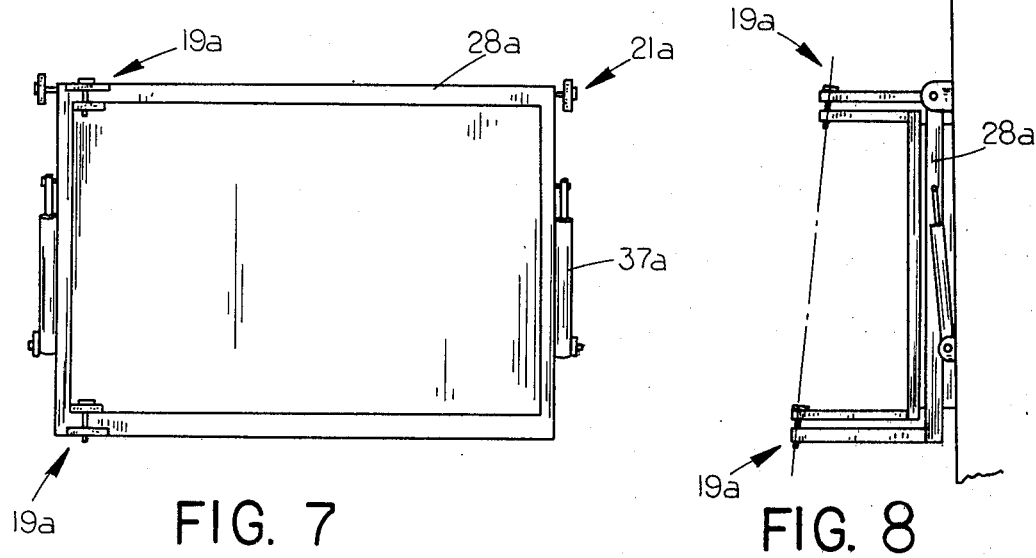
FIG. 7
FIG. 8
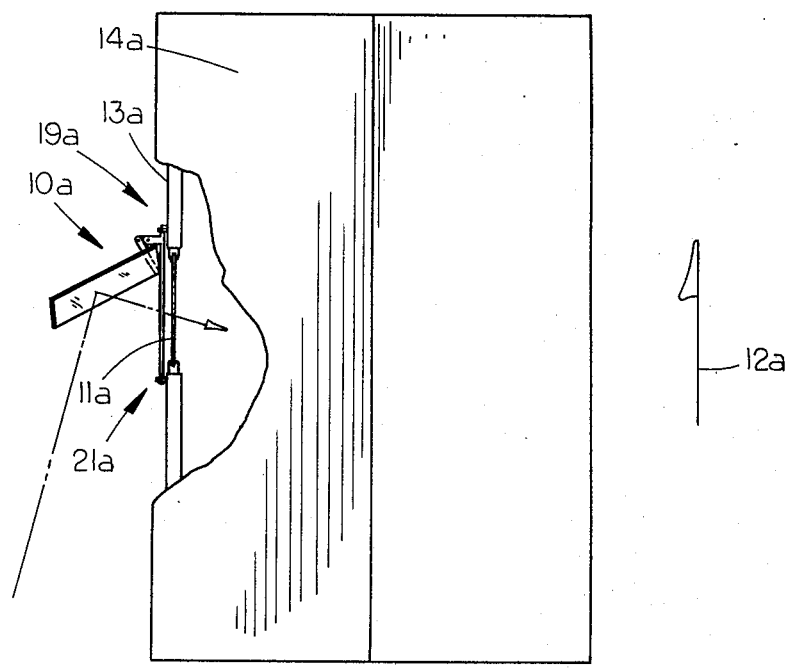
FIG. 5

4,448,187

DEVICE FOR HEATING ABSORBENT SURFACES WITHIN AN ENCLOSED SPACE WITH SOLAR THERMAL RADIATION

TECHNICAL FIELD

The present invention relates generally to sun-light reflecting systems affixed to building exteriors adjacent to window openings and more particularly to a device for reflecting the solar thermal radiation when the sun is in the southern sky during the winter months through window openings on the east or west side of buildings.

BACKGROUND ART

The ever increasing cost of conventional forms of energy has triggered a frenzied search for alternative energy sources. Solar energy, both as a source of heat and as a source of natural illumination, is one of the primary energy sources to which such searches have been directed.

Conventional passive solar energy collection systems take advantage of situations where seasonal and diurnal locations of the sun coincide with both the time and the location of need for solar thermal radiation and do not include facilities to store or transfer it. The advantages of active solar heating systems, which receive, store, and/or transfer the radiant heat of the sun without primary regard to the seasonal and diurnal location of the sun, are realized at considerably greater costs over passive systems.

Existing buildings often are not positioned favorably with respect to the location of the sun, during the winter months when heat is desired or the summer months when solar radiant energy is sought to be avoided, to realize many of the economies of available passive solar energy. Likewise, it is often difficult to build new structures, due to site location constraints, to take advantage of available passive solar energy. Often, buildings which are least able to profit by solar energy collection during the winter months have the largest solar heat gains during the summer months.

DISCLOSURE OF THE INVENTION

An object of the present invention is the provision of an improved device to aid the heating of absorbant surfaces within an enclosed space with passive solar thermal radiation.

Another object is to provide for the reflection of the sun's rays during the winter months through window openings which face primarily east or west.

A further object of the invention is the provision of a device which will diminish the need for a building to have good southern exposure in order to benefit in whole or in part by passive solar energy.

Still another object is to provide a device which, in addition to the above features, also functions as a solar shade during the summer months.

A still further object of the invention is to provide a device having the above-related features, which will also function as a sealed, insulated closure for the window opening.

Yet another object is the provision of a device, having the above-related features, which will also permit the reception of fresh, outside air when desired.

Yet a further object is to provide a device which, in addition to the above-related features, be available for security against entry and storm, which is superior to a merely glassed enclosure.

In a more general sense, it is an object of this invention to provide an insulated reflector window accessory comprising a reflecting surface forming one exterior element of a sandwiched insulator, which is highedly attached along two axes, one generally vertical, and the other horizontal. The generally vertical axis is located along the north side of either an east facing window or a west facing window and provides for the upwardly facing tilt of the reflecting surface as it is pivoted away from the building wall, thus directing a greater portion of the rays of the south sun through the window opening and a lesser portion against the building wall beneath it. When desired, the reflected surface may be adjustably pivoted about the horizontal axis to serve as a solar shade or sealably closed against the building wall. Thus the device is suitable for directing solar heat and light into the building enclosure; shading heat and light from the building enclosure; insulating the building enclosure from the transferring of heat by conduction, convection or radiation; securing the building against burglars and storms and permitting the free flow of air into and out of the building.

These and other objects, advantages and novel features of the present invention will become apparent from the following detailed description of the invention when considered in conjunction with the accompanying drawings.

BRIEF DESCRIPTION OF THE DRAWINGS

FIG. 5 is a reduced overhead view with parts broken away of a building having another mode of the device of the present invention installed and in position to reflect the winter sun's rays through a west window opening;

FIG. 6 is a top plan view of the mode of FIG. 5 when the reflecting surface is parallel to the building wall and also showing a partial view of the reflecting surface with its supporting frame and brackets pivoted outwardly at 90° to the building wall in phantom lines;

FIG. 7 is a front elevational view of the mode of FIG. 5 in the same position as FIG. 6;

FIG. 8 is a side elevational view of the mode of FIG. 5 in the same position as in FIGS. 6 and 7;

MODES FOR CARRYING OUT THE INVENTION

Figure 1:
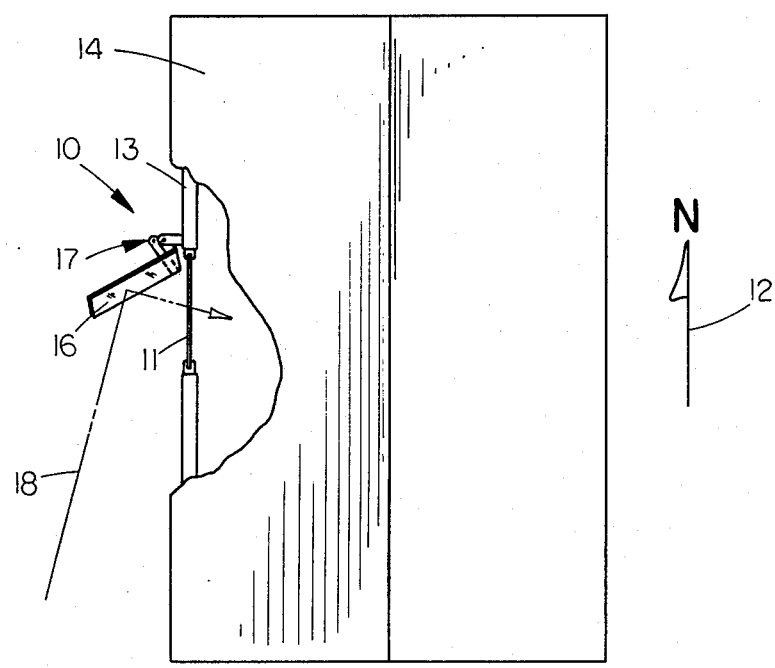
FIG. 1 is a reduced overhead view with parts broken away of a building having one mode of the device of the present invention installed and in position to reflect the winter sun's ray through a west window opening.

Referring now to the drawings wherein like reference numerals designate identical or corresponding parts throughout the several views, and more particularly to FIG. 1 whereon one mode of the present invention, designated generally at (10) is shown mounted north of opening (11) (see north arrow (12)) on west wal (13) of enclosure (14), depicted diagramatically thereon as a building. Device (10) includes reflecting surface (16) which is supported on wall (13) by a double hinge arrangement designated generally at (17).

When the plane of reflecting surface (16) is pivoted into parallel alignment with west wall (13), it will be substantially flush therewith. As reflecting surface (16) is pivoted away from west wall (13) it will gradually tilt upwardly, thus causing the sun's rays, depicted by broken arrow (18), to be reflected through opening (11) rather than beneath it upon west wall (13) as a result of the general elevation of the sun in the southern sky during the winter months in the more populated northern lattitudes. The manner by which double hinge arrangement (17) produces this effect will be explained later. Once the principle upon which double hinge arrangement (17) functions is understood, it will be apparent that a double hinge arrangement made in the mirror image of double hinge arrangement (17) will likewise reflect the rays of the morning sun during the winter months through an opening in the east wall of enclosure (14). In the southern hemisphere the principle upon which the device is based works in reverse with respect to the north and south directions.

Figure 2:
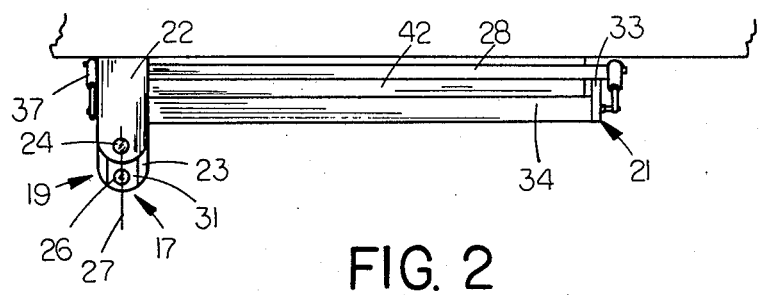
FIG. 2 is a top plan view of the mode of FIG. 1 when the reflecting surface is parallel to the building wall.
Figure 3:
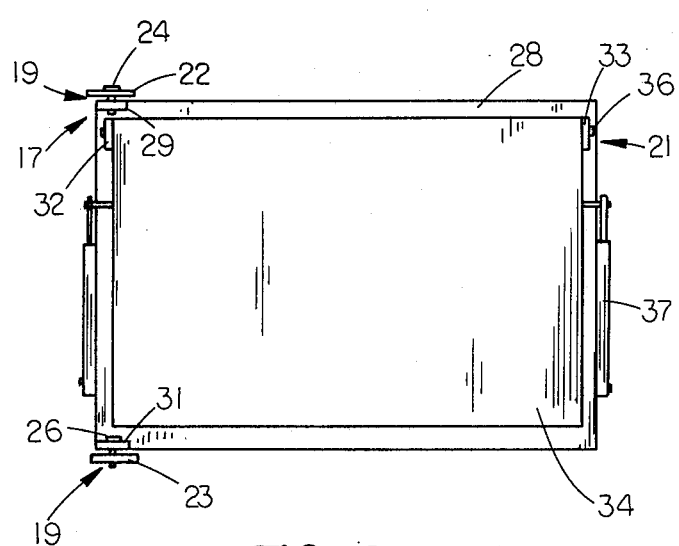
FIG. 3 is a front elevational view of the mode of FIG. 1 in the same position as FIG. 2.
Figure 4:
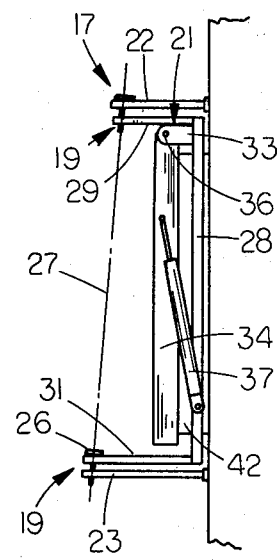
FIG. 4 is a side elevational view of the mode of FIG. 1 in the same position as in FIGS. 2 and 3.
Figure 9:
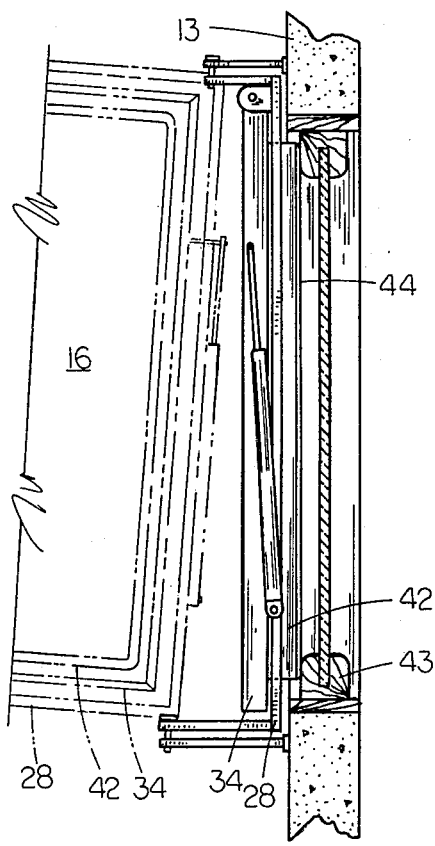
FIG. 9 is an enlarged partial cross-sectional side view of the mode of FIG. 1 with the reflecting surface and certain associated elements also partially shown pivoted to a position 90° from the building wall in phantom lines.
Figure 10:
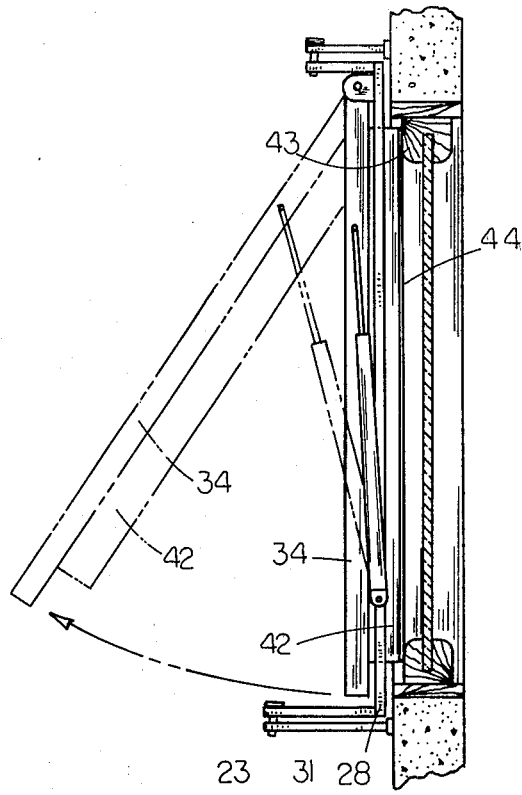
FIG. 10 is an enlarged side elevational view of the mode of FIG. 1 with the reflecting surface and certain assoicated elements shown pivoted about the horizontal hinge arrangement away from the enclosure in phantom lines.

Referring now to FIGS. 2, 3 and 4, (see also FIGS. 9 and 10) and more particulary to FIG. 4, double hinge arrangement (17) is seen to be comprised of a generally vertical hinge arrangement (19) and a horizontal hinge arrangement (21). Vertical hinge arrangement (19) includes upper wall bracket (22) projecting horizontally from and perpendicular to wall (13) and lower wall bracket (23) which is slightly longer than upper bracket (22) and which also projects horizontally from and is perpendicular to wall (13). Brackets (22) and (23) are apertured near their projecting ends for the receipt of upper hinge pin (24) and lower hinge pin (26), respectively. The axis (27) is common to the apertures of both brackets (22) and (23).

An open rectangular frame (28) (seen best in FIG. 3) has projecting from its upper left corner, upper frame bracket (29) and from its lower left corner, lower frame bracket (31), bracket (31) being longer than bracket (29) by the same distance that bracket (23) as longer than bracket (22). Brackets (29) and (31) have apertures coaxial with axis (27) for the receipt of upper pin (24) and lower pin (26), both pins also being coaxial with axis (27) after having been inserted through the respective brackets. Pins (24) and (26) have broadened heads to prevent their falling through the apertures in brackets (22) and (31) respectively.

Brackets (22), (23), (29), and (31) may be bent upwards at their ends, or may be slightly upwardly angled from their points of attachment, in order to avoid friction and binding between themselves and adjacent parts. This problem is best aprreciated by viewing FIG. 9 wherein reflecting surface (16) is shown at 90° to wall (13). It has been found, however, that the device will function satisfactorily without such provisions if adequate space is allowed between adjoining brackets and if the hinge pins are designed to allow sufficient movement relative to the brackets.

Horizontal hinge arrangement (21) includes apertured left bracket (32) and apertured right bracket (33) each attached to the left and right side of frame (28), respectively, near the top thereof and projecting outwardly and horizontally therefrom a short distance which is less than the length of upper frame bracket (29). A second frame (34) is which reflecting surface (16) is supported, has affixed to either side near its upper end a short hinge pin (36) for pivotal rotation within apertured brackets (32) and (33).

The north-south dimension of supporting frame (34) in this embodiment is slightly less than that of open frame (28), thus permitting hinge arrangement (21) to function most effectively as described hereinabove, as well as the installation of pivoting piston and air cylinder assemblies (37) between one or both sides of open frame (28) and supporting frame (34). As shown herein, piston and cylinder assemblies (37) are for resisting movement of frame (34) about hinge arrangement (27) in either direction and may also include a position locking feature (not shown) of a well-known type.

An alternate mode for carrying out the invention is depicted generally at (10a) in FIG. 5, the primary difference with respect to mode (10) being that horizontal hinge arrangement (21a) is affixed to west wall (13a) of enclosure (14a) just above window opening (11a) and generally vertical hinge arrangement (19a) is affixed to open frame (28a) (as best can be seen in FIGS. 6, 7 and 8), instead of the reverse. Mode (10a) in other respects has either the same parts as mode (10) or parts which function in a corresponding manner, all of such parts bearing the same numerical designation as their counterpart of mode (10) with the letter (a) appended thereto.

Referring now to FIG. 6, the principle (which applies equally to reflecting surface (16) of mode (10)) whereby reflecting surface (16a) slopes upwardly as supporting frame (34a) is pivoted away from west wall (13a) is understood by observing the relationship between that portion of mode (10a) shown in phantom lines and the same portion shown in solid lines thereon. The portion shown in phantom lines thereon includes reflecting surface (16a), supporting frame (34a), upper frame bracket (29a) and lower frame bracket (31a). It should be clear from FIG. 6 that when reflecting surface (16a) is pivoted as much as 90° from its position flush with west wall (13a) the lower portion of reflecting surface (16a) will be generally south of the upper portion thereof, due to the greater length of lower frame bracket (31a) than upper frame bracket (29a). (See FIG. 9 for a view of mode (10) when reflecting surface (16) is in this position.) It follows that the same result will occur, but to a lesser extent, when reflecting surface (16a) is pivoted to other positions away from west wall (13a). Were vertical hinge arrangement (19a) not angled outwardly slightly from west wall (13a), much of the reflected solar thermal radiation would strike the portion of west wall (13a) below opening (11a) rather than being reflected therethrough and as a consequence being absorbed by surfaces within enclosed space (14a).

Horizontal hinge arrangement (21) and (21a) permit modes (10) and (10a), respectively, to serve as an adjustable angle sun shield or awning at times when the sun's rays are not desired within their respective enclosures, such as during the summer months or other periods when the sun's rays are more directly overhead. This use of the device in mode (10) is shown in phantom lines in FIG. 10. Of course, ordinarily when horizontal hinge arrangement (21) and (21a) is in use, vertical hinge arrangement (19) and (19a), respectively, would not be. In addition, the versatility of the present invention in both modes can be appreciated by the fact that the reflective surfaces can be positioned flush across their openings at night during the winter months to reflect radiant thermal energy back into the enclosures or positioned wide open for night time comfort during the summer months when it may be desirable to ventilate the enclosed space with fresh outdoor air.

It should be obvious that pivoted piston and cylinder arrangements (37) and (37a) may be operated by hydraulic or air pressure to pivot open frame (28) and (28a), respectively, about their horizontal hinge arrangements and that the position of supporting frame (34) and (34a) about their generally vertical hinge arrangements may also be controlled by hydraulic power or air pressure in a well known manner. Other mechanical aids such as motorized devices or manually operated cranks located either inside or outside of enclosures (14) and (14a), all of which are well known, may also be provided with the present invention.

Figure 11:
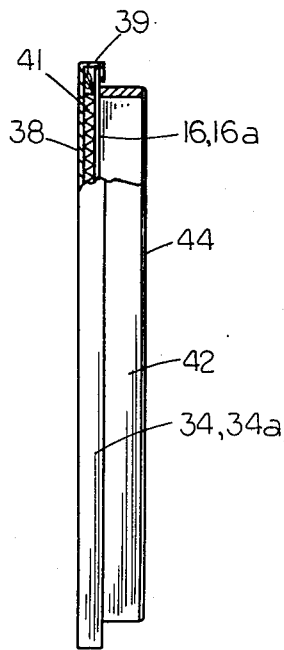
FIG. 11 is an enlarged side elevational view, partially in cross-section, of the reflecting surface and certain other elements associated with the insulating features of both modes of the invention.
Figure 12:
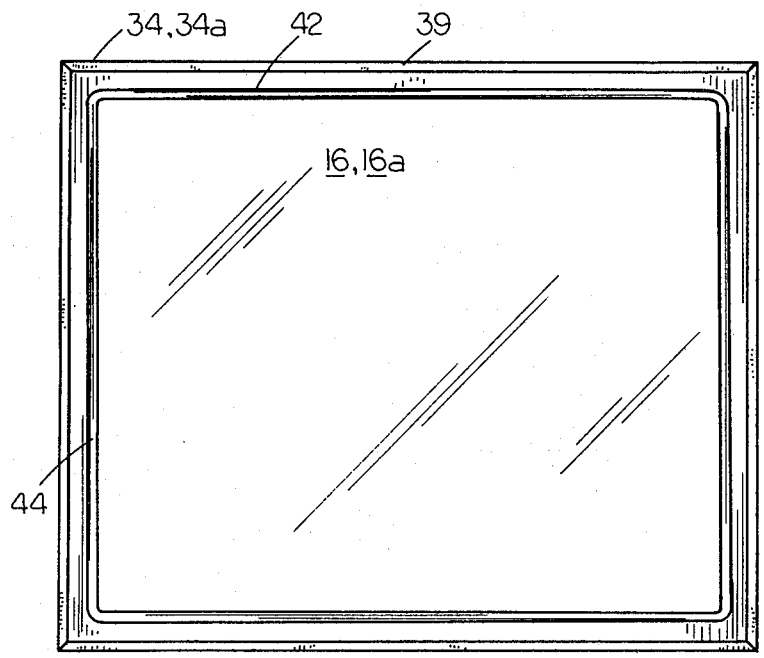
FIG. 12 is an enlarged rear elevational view of the reflecting surface and certain other elements associated with the insulating characteristics of both modes of the invention.

An additional feature of either mode (10) or (10a) of my device is that either mode lends itself readily to serving as an excellent insulating cover for its opening. FIGS. 11 and 12 depict support frame (34) or (34a) supporting reflecting surface (16) or (16a), respectively, along with additional elements which are provided to maximize the effect of this insulating feature. Reflecting surface support frame (34) and (34a) include opaque surface (38) and L-shaped perimeter flange (39) for the provision of structure for supporting, between opaque surface (38) and reflecting surface (16) or (16a), sandwiched insulating material (41) (see FIG. 11).

Spacer (42) is rectangular shaped and open-centered. It is affixed to that side of reflecting surface (16) and (16a) which faces enclosure (11) and (11a) and is of such depth that when supporting frame (34) or (34a) is parallel with wall (13) or (13a), respectively, the projecting edge of spacer (42) will be in contact with the portion of wall (13) or (13a) which surrounds opening (11) and (11a), respectively. If the oepnings are enclosed with a window set in mullions (43), spacer (42) may contact the mullions (see FIGS. 9 and 10). To achieve a positive seal, compressible seal (44) is affixed along the exposed edge of spacer (42) (see FIG. 11).

Thus, both modes (10) and (10a) may also provide an insulating system for the space within their enclosures when desired, comprised of air space within the confinement of spacer (42), a windowed opening and reflecting surface (16) or (16a); the reflection of interior radiant thermal energy by reflecting surface (16) or (16a); and insulating material (41) sandwiched between backing (38), and reflecting surface (16) or (16a).

INDUSTRIAL APPLICABILITY

The industrial applicability of the insulated reflector window accessory is believed to be manifest from the foregoing description. East or west facing windows having the present invention mounted adjacent thereto for reflecting the winter sun therethrough are thereby rendered able to provide the advantages of south facing windows.

Accordingly, it is believed that all of the objects mentioned above are accomplished by use of the modes for carrying out the invention disclosed herein. Obviously, many modifications and variations of the present invention are possible in light of the above teachings. It is therefore to be understood that, within the scope of the appended claims, the invention may be practiced otherwise than as specifically described.

I claim:

1. A device for heating absorbant surfaces within an enclosed space with solar thermal radiation, comprising:
   an enclosure having an opening with a generally east or west orientation formed in a wall thereof;
   a frame means mounted to the exterior wall of said enclosure adjacent to the north side of the opening, at an angle such that the plane in which the frame lies intersects with the plane in which the opening lies at a line which forms an angle with a generally vertical line at the north side of the opening, the intersecting line bearing north from the point it intersects with said vertical line; and
   a reflecting surface supported by said frame means whereby the sun's rays are reflected upwardly and inwardly through said opening when the sun is south of the opening.

2. The device of claim 1 further comprising:
   an upper wall bracket extending from the wall of said enclosure adjacent the upper north corner of the opening;
   a lower wall bracket extending from the wall of said enclosure adjacent the lower north corner of the opening, a short distance beyond the upper wall bracket;
   an upper frame bracket extending from the upper north corner of said frame;
   a lower frame bracket extending from the lower north corner of said frame a distance beyond the upper frame bracket equal to the distance said lower wall bracket extends beyond said upper wall bracket; and
   upper and lower coaxial hinge means connecting said upper wall and frame brackets and said lower wall and frame brackets, respectively, whereby the frame can be pivoted to a closed position substantially parallel to the plane of the opening and to positions away from the opening in which it will face upwardly.

3. The device of claim 2 wherein said frame means includes:
   a portion having an opening in its center; and
   a portion for supporting said reflecting surface, hingedly mounted on the upper edge of said open frame portion, along a line generally perpendicular to the axes of said coaxial hinge means, whereby the rear side of said reflecting surface may adjustably shade the interior of the enclosure when the sun is not substantially south of the opening.

4. The device of claim 3 further comprising:
   a translucent planar surface mounted within the wall opening and coplanar therewith;
   spacer means affixed to the perimeter of the reflecting surface for contacting the portion of the enclosure wall surrounding the opening formed therein, whereby an insulating air space willl be created when the frame is pivoted to a closed position and its supporting portion is adjusted to be coplanar with its portion which has an opening.

5. The device of claim 4 further including a compressible seal on the contacting edge of the spacer means.

6. The device of claim 5 further comprising:
insulation affixed to the rear side of said reflecting surface.

7. The device of claim 2 wherein said frame means includes:
a portion open in its center; and
a rigid, opaque portion for supporting said reflecting surface, hingedly mounted on the upper edge of said open frame portion along a line generally perpendicular to the axes of said coaxial hinge means, whereby said opaque supporting portion may adjustably shade the interior of the enclosure when the sun is not substantially south of the opening.

8. A device for heating absorbant surfaces within an enclosed space with solar thermal radiation, comprising:
an enclosure having an opening with a generally east or west orientation formed in a substantially vertical wall thereof;
an open frame hingedly mounted to the exterior wall of said enclosure along a horizontal line adjacent to and above the opening;
hinge means, oriented generally vertically for mounting a supporting frame to the north side of said open frame, said hinge means including:
an upper open frame bracket extending from the upper north corner of the open frame;
a lower open frame bracket extending from the lower north corner of the open frame a short distance beyond the upper open frame bracket;
an upper supporting frame bracket extending from the upper north corner of the supporting frame;
a lower supporting frame bracket extending from the lower north corner of said support frame a distance beyond the upper supporting frame bracket equal to the distance said lower open frame bracket extends beyond said upper open frame bracket; and
upper and lower coaxial hinge means connecting said upper open and supporting frame brackets and said lower open and supporting frame brackets, respectively, whereby said supporting frame can be pivoted to a closed position substantially parallel to the plane of the opening and to a position away from the opening in which it will face upwardly; and
a reflecting surface generally coplanar with and supported by the supporting frame so as to reflect solar thermal radiation upwardly and inwardly through the opening into the enclosure.

9. The device of claim 8 further comprising;
a translucent planar surface mounted within the opening and coplanar therewith;
spacer means affixed to the perimeter of the reflecting surface for contacting the portion of the enclosure wall surrounding the opening therein when the said frames are pivoted to a closed position, whereby an insulating air space will be created.

10. The device of claim 9 further comprising:
a compressible seal on the contacting edge of the spacer means.

11. The device of claim 10 further comprising:
insulation affixed to the rear side of said reflecting surface.

12. The device of claim 8 wherein said supporting frame is further characterized as being opaque, whereby said opaque supporting frame may adjustably shade the interior of the enclosure when the sun is not substantially south of the opening.

* * * * *